United States Patent
Hornburg et al.

(10) Patent No.: US 8,573,344 B2
(45) Date of Patent: Nov. 5, 2013

(54) DEVICE FOR DRIVING A FUEL CELL VEHICLE

(75) Inventors: Gerald Hornburg, Holzmaden (DE); Simon Steinhuebl, Holzmaden (DE); Werner Englert, Kirchheim (DE)

(73) Assignee: Daimler AG, Stuttgart (DE)

( * ) Notice: Subject to any disclaimer, the term of this patent is extended or adjusted under 35 U.S.C. 154(b) by 838 days.

(21) Appl. No.: 12/377,969

(22) PCT Filed: Aug. 8, 2007

(86) PCT No.: PCT/EP2007/006959
§ 371 (c)(1),
(2), (4) Date: Apr. 15, 2010

(87) PCT Pub. No.: WO2008/022709
PCT Pub. Date: Feb. 28, 2008

(65) Prior Publication Data
US 2010/0200317 A1    Aug. 12, 2010

(30) Foreign Application Priority Data
Aug. 19, 2006  (DE) .................. 10 2006 039 106

(51) Int. Cl.
B60R 16/04    (2006.01)
(52) U.S. Cl.
USPC ............... 180/68.5; 903/908; 180/65.31
(58) Field of Classification Search
USPC .................. 903/908; 180/68.5; 429/471
See application file for complete search history.

(56) References Cited

U.S. PATENT DOCUMENTS

| | | | |
|---|---|---|---|
| 5,947,226 A | 9/1999 | Bellamy et al. | |
| 6,159,256 A | 12/2000 | Bonville, Jr. et al. | |
| 6,648,085 B2 * | 11/2003 | Nagura et al. | 180/65.1 |
| 6,994,178 B2 * | 2/2006 | Mizuno | 429/430 |
| 7,086,492 B2 * | 8/2006 | Kawasaki et al. | 180/274 |
| 7,121,366 B2 * | 10/2006 | Horii | 180/65.1 |
| 7,353,900 B2 * | 4/2008 | Abe et al. | 180/68.5 |
| 7,358,003 B2 * | 4/2008 | Imaseki et al. | 429/435 |
| 7,404,462 B2 * | 7/2008 | Tokumura et al. | 180/65.31 |
| 7,556,873 B2 * | 7/2009 | Higashi | 429/414 |
| 7,631,712 B2 * | 12/2009 | Watanabe | 180/68.5 |
| 7,678,494 B2 * | 3/2010 | Tsuchiya | 429/120 |
| 7,690,686 B2 * | 4/2010 | Hashimura et al. | 280/782 |
| 7,743,863 B2 * | 6/2010 | Shindou | 180/68.5 |

(Continued)

FOREIGN PATENT DOCUMENTS

| | | |
|---|---|---|
| EP | 1 266 783 B1 | 12/2002 |
| EP | 1 309 026 A1 | 5/2003 |
| GB | 593121 | 10/1947 |
| WO | WO 2005/100067 A1 | 10/2005 |

OTHER PUBLICATIONS

International Search Report dated Nov. 20, 2007 (Three (3) pages).

*Primary Examiner* — Jeffrey J Restifo
(74) *Attorney, Agent, or Firm* — Crowell & Moring LLP

(57) ABSTRACT

A vehicle drive system comprises an electrical drive motor and a fuel cell system providing the electrical power. According to the invention, the drive motor and the fuel cell are integrated into a unit and firmly joined together. The fuel cell system may comprise two fuel cells or fuel cell stacks, which are arranged relative to each other so as to form a "V". Peripheral units for operation of the fuel cell may be arranged in an interior of the V.

5 Claims, 1 Drawing Sheet

(56) References Cited

U.S. PATENT DOCUMENTS

| | | | |
|---|---|---|---|
| 7,798,269 B2* | 9/2010 | Makuta et al. | 180/68.5 |
| 7,810,596 B2* | 10/2010 | Tsuchiya | 180/68.5 |
| 7,819,215 B2* | 10/2010 | Tsuchiya | 180/68.5 |
| 8,016,062 B2* | 9/2011 | Jufuku | 180/65.31 |
| 2003/0033992 A1* | 2/2003 | Ohnemus | 123/3 |
| 2006/0040573 A1 | 2/2006 | Kobayashi et al. | |
| 2006/0246332 A1* | 11/2006 | Higashi | 429/26 |
| 2010/0065359 A1* | 3/2010 | Jufuku et al. | 180/68.5 |
| 2010/0116576 A1* | 5/2010 | Jufuku et al. | 180/68.5 |
| 2010/0285380 A1* | 11/2010 | Yamagishi | 429/434 |
| 2011/0183230 A1* | 7/2011 | Hornburg | 429/471 |

* cited by examiner

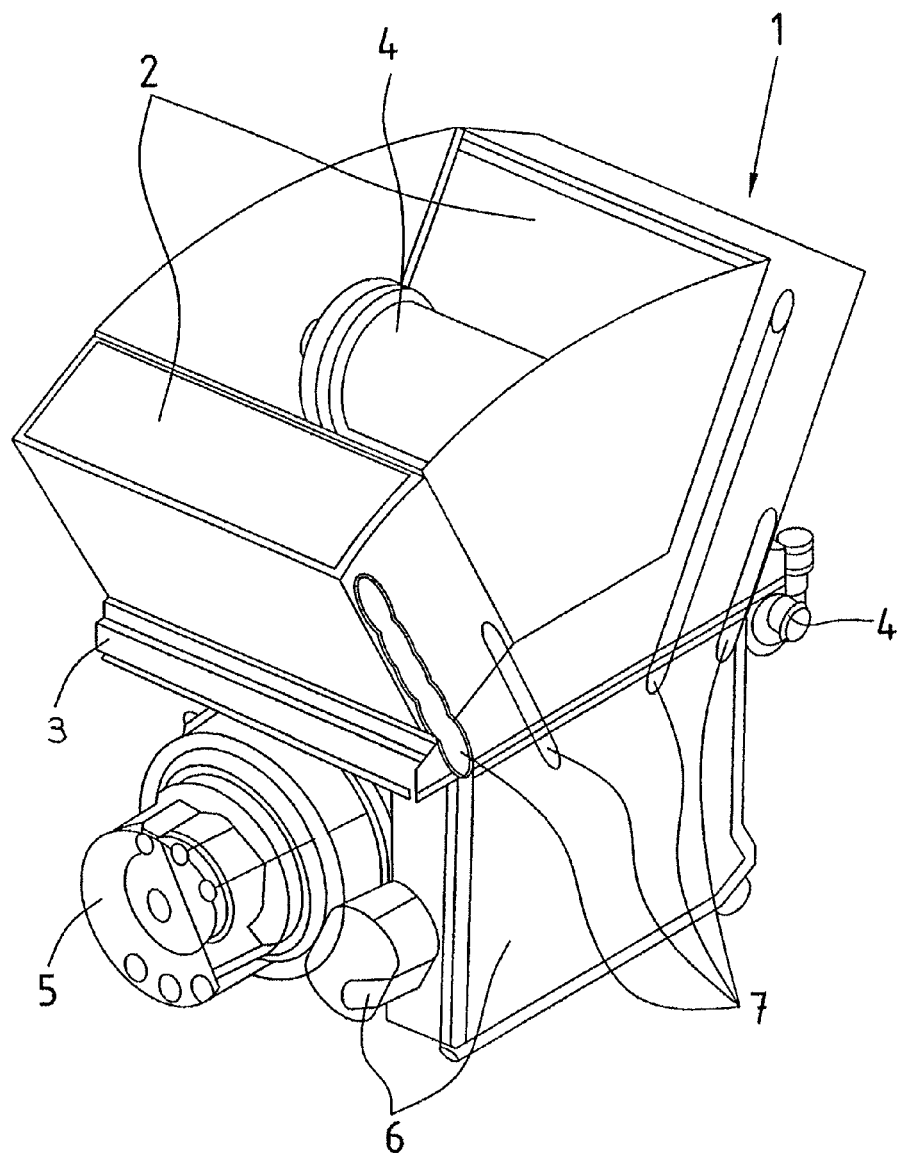

DEVICE FOR DRIVING A FUEL CELL VEHICLE

CROSS REFERENCE TO RELATED APPLICATIONS

This application is related to U.S. patent application Ser. No. 12/377.970, filed concurrently herewith.

This application is a national stage of International Application No. PCT/EP2007/006959, filed Aug. 7, 2007, which claims priority under 35 U.S.C. §119 to German Patent Application No. 10 2006 039 106.3, filed Aug. 19, 2006, the entire disclosure of which is herein expressly incorporated by reference.

BACKGROUND AND SUMMARY OF THE INVENTION

The invention relates to a vehicle propulsion system which comprises an electrical drive motor and a fuel cell that provides the electric power.

It is known from European Patent Document EP 1 266 783 E1 to decouple the fuel cell and the drive motor by suitable vibration dampers in a vehicle which is driven by a fuel cell system. The flexible electrical connections which are required between the fuel cell, the drive motor (and optionally the converter) have proved to be disadvantageous in such structures, in particular due to the very high currents and/or voltages involved. Adequate reliability of the connections entails highly complex production and installation methods, as stringent requirements apply to flexibility, watertightness and electromagnetic compatibility (EMC).

One object of the invention is to provide a simple, compact vehicle propulsion structure which can be constructed inexpensively and reliably and which permits simple installation.

This and other objects and advantages are achieved by the vehicle propulsion system according to the invention, in which the fuel cell and the electrical drive motor are integrated into a single unit and firmly joined together. In contrast to the prior art, "firmly" in this case means not decoupled; thus for example they may be joined by a direct screw joint, for example to a common supporting structure.

The integration of the fuel cell and drive motor as a unit reduces the costs, mass and volume of the unit. Moreover, previous systems have required complex (and thus costly) cables and connectors to provide in particular electrical connection between the fuel cell and ensure electromagnetic compatibility (EMC). Such cables and connectors may be dispensed with thanks to integration as a unit. In addition to the advantages with regard to costs and installation space, dispensing with connections and cabling which must be constructed flexibly means that reliability may be increased.

Furthermore, integration as a unit also permits improved, lighter, faster (and thus also more inexpensive) installation. Integration as a unit may readily be achieved by preassembly outside the vehicle, and the preassembled unit may then simply be installed in the vehicle (for example in the engine compartment in place of a combustion engine), and then connected with the drive shafts, media supplies etc.

The centralized location of system masses in the integrated unit has a positive impact on acoustic characteristics and more effective damping of the overall unit may be provided. The structure according to the invention thus also achieves advantages in the efficient implementation of NVH (noise, vibration, harshness) measures.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic three-dimensional representation of a drive device according to the invention in an exemplary embodiment.

DETAILED DESCRIPTION OF THE DRAWINGS

The FIGURE shows a drive device 1 which comprises two fuel cells or fuel cell stacks 2 arranged in a V relative to one another and fastened on a common joining element 3. The V-shaped arrangement is here selected purely by way of example; any other conceivable arrangements of one or more fuel cells or fuel cell stacks 2 are, of course, also possible for the purposes of the invention. Peripheral units 4 for operation of the fuel cells 2 (in this case for example a turbocompressor for supplying air to the fuel cells) are arranged between the fuel cells 2, thus in this case in the interspace formed by the V-shaped arrangement.

In addition, an electrical drive motor 5, electronic components 6 (taking the form of a common electronics unit and substantially comprising a converter and peripheral components), together with further peripheral units 4 for the fuel cells 2 are arranged beneath the joining element 3. The peripheral units 4 form, together with the fuel cells 2, a fuel cell system which, when appropriately connected to air and hydrogen lines, supplies electrical energy.

The drive device 1 here forms an integrated unit in which all the components, but in particular the electrical drive motor 5 and the fuel cells 2, which here supply power, are firmly joined together. In principle, this may be achieved by means of any desired supporting structure, or, as here in the case of self-supporting individual components, by means of the joining element 3.

Integrating the fuel cell system 2, 4 and drive motor 5 as a unit 1 reduces the number of detachable interfaces, since all that need be produced here between the integrated drive device 1 and the vehicle are connections for coolant and hydrogen and the connection to an air filter. In particular in the fault-prone electrical area, cable routing is simplified and cable lengths are greatly shortened, thereby ensuring the shortest possible transmission paths for the current from the fuel cells 2 to the electrical drive 5. In addition, technically complex electrical components, such as for current distribution, are omitted or are greatly simplified by integration into the unit 1. The complex flexible cabling with plug connectors needed due to the required electromagnetic compatibility and watertightness may also be omitted. As a result, costs are appreciably reduced and reliability is increased. At the same time, mass and volume may additionally be distinctly reduced.

In addition to integration of the peripheral units 4 for the fuel cells 2 in the drive device or unit 1, it is also possible to provide therein in particular current carrying elements. The latter may, for example, take the form of copper bars 7 which follow the shortest path from the fuel cells 2 to a commonly used electronic unit 6. If necessary, the electronic unit may include galvanic disconnecting switches and the electronics for actuation of the electrical vehicle drive, as well as open- and closed-loop control and power electronics for the peripheral units and/or a necessary sensor system. In addition, the detachable connections of the current-carrying components (copper bars or cables) may also be accommodated within the electronic unit 6. As a result, watertightness and EMC may be achieved distinctly more straightforwardly. In addition, many complex and costly interfaces in the high voltage cabling and piping are omitted.

The preferred embodiment provides a preassembly fuel cell system 2, 4 and the electrical drive 5 together with integrated electronic components 6 on a common supporting structure 3. The entire preassembled unit 1 may be suspended in the vehicle (not shown) in an oscillating manner, for example, in what was previously an engine compartment of a vehicle (in place of the combustion engine), on the engine mounts thereof before it is connected to the drive shafts (universal joint or half shafts), to the hydrogen supply from a reservoir or an on-board gas generation system and to an air filter and optionally to an exhaust gas system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Apparatus for driving a vehicle, said apparatus comprising:
    an electrical drive motor; and
    a fuel cell system providing electrical power; wherein,
    the drive motor and the fuel cell system are integrated into a unit and firmly joined together; and
    the fuel cell system comprises two fuel cells or fuel cell stacks arranged in a V shape relative to one another.

2. The apparatus according to claim 1, further comprising a common supporting structure for said unit.

3. The apparatus according to claim 1, wherein said unit is suspended in oscillating manner in the vehicle.

4. The apparatus according to claim 1, wherein said unit comprises peripheral units for operation of the fuel cell.

5. The apparatus according to claim 4, wherein the peripheral units are arranged between the fuel cells, in an interspace formed by the V-shaped arrangement.

\* \* \* \* \*